United States Patent
Helda

(10) Patent No.: US 7,406,773 B2
(45) Date of Patent: Aug. 5, 2008

(54) MAGNET ASSEMBLY

(75) Inventor: Eric John Helda, Cornelius, NC (US)

(73) Assignee: Irwin Industrial Tool Company, Huntersville, NC (US)

( * ) Notice: Subject to any disclaimer, the term of this patent is extended or adjusted under 35 U.S.C. 154(b) by 36 days.

(21) Appl. No.: 11/023,973

(22) Filed: Dec. 23, 2004

(65) Prior Publication Data

US 2006/0137197 A1   Jun. 29, 2006

(51) Int. Cl.
G01C 9/02   (2006.01)
(52) U.S. Cl. .......................................... 33/347; 33/608
(58) Field of Classification Search .................. 33/347, 33/608, 484, DIG. 1, 300
See application file for complete search history.

(56) References Cited

U.S. PATENT DOCUMENTS

| | | | | |
|---|---|---|---|---|
| 1,617,937 | A * | 2/1927 | Boucher et al. | 33/348.2 |
| 2,625,585 | A * | 1/1953 | Krouse | 324/202 |
| 2,749,505 | A * | 6/1956 | McNary | 324/230 |
| 2,790,069 | A * | 4/1957 | Alexander | 33/348.2 |
| 3,071,863 | A * | 1/1963 | MacMillan | 33/301 |
| 3,186,099 | A * | 6/1965 | Florko, Jr. | 33/347 |
| 3,715,808 | A | 2/1973 | Petrik | |
| 4,335,524 | A | 6/1982 | Schimming | |
| 4,392,305 | A * | 7/1983 | Nix et al. | 33/834 |
| 4,456,255 | A * | 6/1984 | Braunhut | 463/47.7 |
| 4,593,475 | A * | 6/1986 | Mayes | 33/347 |
| 4,863,267 | A * | 9/1989 | Bendickson et al. | 356/155 |
| 4,970,796 | A | 11/1990 | Masters et al. | |
| 4,977,680 | A * | 12/1990 | Marshall | 33/508 |
| 4,993,710 | A | 2/1991 | Marshall | |
| 5,094,009 | A * | 3/1992 | Koch et al. | 33/834 |
| 5,207,004 | A | 5/1993 | Gruetzmacher | |
| 5,421,094 | A | 6/1995 | McCord et al. | |
| 5,575,073 | A | 11/1996 | Von Wedemayer | |
| 5,755,037 | A | 5/1998 | Stevens | |
| 6,032,376 | A | 3/2000 | Shurtleff | |
| 6,568,095 | B2 | 5/2003 | Snyder | |
| 6,769,192 | B2 * | 8/2004 | Johansson et al. | 33/608 |
| 7,204,029 | B2 * | 4/2007 | Tran et al. | 33/451 |
| 2004/0143981 | A1 * | 7/2004 | Krehel et al. | 33/382 |
| 2004/0216319 | A1 * | 11/2004 | Muchnik | 33/666 |

FOREIGN PATENT DOCUMENTS

EP   0 126 844   12/1984

* cited by examiner

*Primary Examiner*—Christopher W. Fulton
*Assistant Examiner*—Tania C Courson
(74) *Attorney, Agent, or Firm*—Dennis J. Williamson; Moore & Van Allen, PLLC

(57) ABSTRACT

A magnet assembly is provided including a housing having a first end and a second end. A magnet is placed within a recess formed in the first end of the housing and a spring is positioned in at least a portion of the second end of the housing. A method of mounting a magnet assembly in a tool is provided. The method includes providing a magnet assembly including a housing having a recess formed in a first end of the housing and a spring positioned in a second end of the housing. The method further includes placing the magnet assembly into an opening defined in a tool and placing a magnet into the recess, and pressing the magnet against the spring to position the magnet within the tool.

10 Claims, 4 Drawing Sheets

MAGNET ASSEMBLY

BACKGROUND

1. Technical Field

The present invention relates to magnets. In particular, the present invention relates to a magnet including a housing for positioning the magnet within a tool.

2. Background Information

Many kinds of tools are known that incorporate a magnet or a magnetic portion to facilitate the attachment of the tool to a metal object. For example, tools may be magnetized in order to hold the tools against a metal storage rack or against a metal work surface.

Some spirit level tools include a magnet to hold the level against a pipe or other metal surface that needs to be leveled. When a magnet is used on the measuring surface, the magnet must be calibrated to be level with the leveling surface. Commonly, strip or bar magnets are used along a measuring surface of the level, held in place by another bar or adhesive. Alternatively, the strip or bar magnets may be held in place with plastic brackets that snap into place in the measuring surface which then must be calibrated and secured into position. This calibration of structures such as snap-in brackets or bars can be costly and time-consuming.

Therefore, it is an object of the present invention to provide a magnet assembly that is easily and inexpensively mounted in a tool and which may be easily calibrated using a biasing spring when the magnet assembly is inserted into the tool.

BRIEF SUMMARY

In order to alleviate one or more shortcomings of the prior art, a magnet assembly and a method for mounting a magnet assembly in a tool are provided herein.

In one aspect of the present invention, a magnet assembly for mounting into a tool is provided. The magnet assembly includes a housing having a first end and a second end. A magnet is placed within a recess formed in the first end of the housing and a spring is positioned in at least a portion of the second end of the housing. The spring biases the magnet relative to at least a portion of the tool.

In another aspect of the present invention, a method of placing a magnet assembly in a tool is provided. The method includes providing a magnet assembly including a housing having a recess formed in a first end of the housing and a spring positioned in a second end of the housing. The method further includes placing the magnet assembly in an opening defined in a tool and placing a magnet into the recess and pressing the magnet against the spring into position within the tool.

In another aspect of the present invention, a device is provided including a level having a measuring surface, an opening defined into the measuring surface and a magnet assembly for placement at least partially within the opening. The magnet assembly includes a housing having a first end and a second end, a magnet placed within a recess formed in the first end of the housing and a spring positioned in at least a portion of the second end of the housing. The spring biases the magnet relative to the level.

In another aspect of the present invention, a magnet assembly for mounting into a tool having a level surface is provided. The magnet assembly includes an expandable housing having a first end including an opening defined therein and a second end. The magnet assembly further includes a magnet placed within the opening in a position for alignment of the magnet with the level surface. The opening is adapted to expand for reception of said magnet and the housing frictionally engages the magnet and the tool to retain the magnet in the tool.

In yet another aspect of the present invention, a method is provided for placing a magnet assembly in a tool. The method includes providing a magnet assembly housing having a housing opening defined therein, placing the housing in an opening defined in the tool and placing the magnet in the housing opening and pressing the magnet into alignment with a level surface of tool. The tool opening is sized to frictionally receive the housing.

Advantages of the present invention will become more apparent to those skilled in the art from the following description of the preferred embodiment of the invention which has been shown and described by way of illustration. As will be realized, the invention is capable of other and different embodiments, and its details are capable of modification of various respects. Accordingly, the drawings and description are to be regarded as illustrative in nature and not as restrictive.

DETAILED DESCRIPTION OF THE DRAWINGS AND THE PRESENTLY PREFERRED EMBODIMENTS

Figure 1:
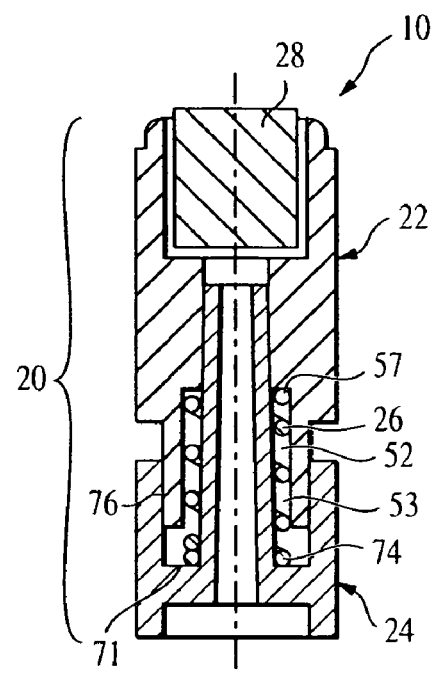
FIG. 1 is a side elevational view of a magnet assembly in accordance with the present invention.

A preferred embodiment of the magnet assembly 10 of the present invention is shown in FIG. 1. The magnet assembly 10 includes a housing 20 having a first portion 22 and a second portion 24, a spring 26 and a magnet 28.

Figure 2:
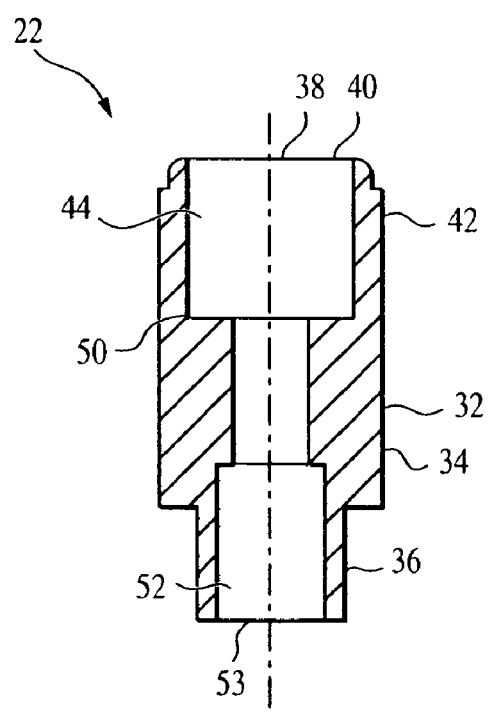
FIG. 2 is side elevational view of a first portion of the housing of the magnet assembly shown in FIG. 1.

The first portion 22 of the housing 20 of the preferred embodiment is shown in FIG. 2. The outer surface 32 of the first portion 22 is generally cylindrically shaped. Although the outer surface 32 of the first portion 22 is shown as being cylindrically shaped, those skilled in the art will readily understand that the outer surface 32 may be alternatively shaped. For example, the outer surface 32 may be elliptical, cuboidal, or any shape adapted to fit within a tool such as a level. In the preferred embodiment, the outer surface 32 includes a proximal section 34 and a reduced diameter distal section 36. The first portion 22 includes an interior bore 38 defined inwardly from an opening 40 in a proximal end 42 through to the distal end 36.

A first recess 44 is formed beginning at the opening 40 and the first recess 44 is sized to receive the magnet 28 so that a top surface 46 of the magnet 28 may be calibrated to be level with a tool into which the magnet assembly 10 has been mounted. (Described in more detail below.) The magnet 28 may be any type of magnet known to one of skill in the art. The magnet 28 is shaped to fit closely within the first recess 44 and the top surface 46 of the magnet 28 is preferably coplanar in relation to an outer surface of the tool into which the magnet assembly 10 is inserted. In addition, a second recess 52 formed in the distal end 36 includes an opening 53 sized to receive a first end 57 of the spring 26.

Figure 3:
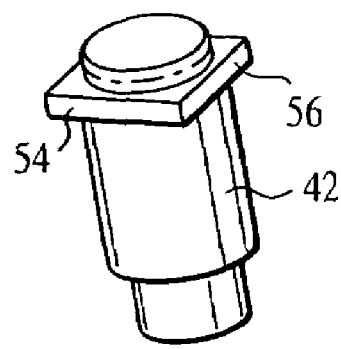
FIG. 3 is a perspective view of the first portion of the housing shown in FIG. 2.

As shown in FIG. 3, the proximal end 42 of the first section 22 may further include a flange 54 extending radially outwardly from the proximal section 34. In a preferred embodiment, the exterior 56 of the flange 54 forms a square-shaped outline. One of skill in the art will recognize that the flange 54 may be any shape, including but not limited to circular, elliptical, rectangular, and triangular.

Figure 4:
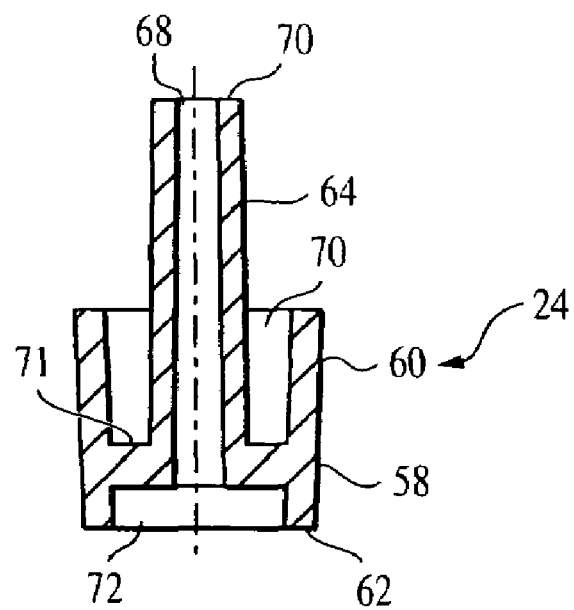
FIG. 4 is a side elevational view of a second portion of the housing of the magnet assembly shown in FIG. 1.

The second portion 24 of the housing 20 of the preferred embodiment is shown in FIG. 4. The second portion 24 is shaped in complimentary fashion to telescopically mount with the first portion 22 of the housing 20. The second portion 24 and the first portion 22 move relative to each other. When the first portion 22 of the housing 20 is cylindrically shaped, the second portion 24 also includes a cylindrically shaped outer surface 58. The outer surface 58 is formed from a flange 60 upstanding from a first end 62 of the second portion 24. A projection 64 extends axially from the first end 62 interior to the flange 60. The projection 64 is also shaped to fit with the interior of the bore 38 of the first portion 22. Any shape for the projection 64 may be used to fit with the corresponding shape of the interior bore 38. In a preferred embodiment, the projection 64 is cylindrically shaped and includes an interior bore 68 that extends through the second portion 24. An annular space 70 is formed between the flange 60 and the projection 64 and includes a surface 71 at the bottom of the space 70. A second end 74 of the spring 26 contacts the surface 71 in the preferred magnet assembly 10. The second portion 24 may further include a recess 72 formed in the first end 62 of the second portion 24. As shown in FIG. 4, the interior bore 68 opens into the recess 72. The recess 72 may be any shape, including cylindrical as shown. The housing 20 may be made from any material known to one of skill in the art, preferably ABS plastic.

The spring 26 of a preferred embodiment is shown in FIG. 1 as a helical coil. Alternatively, the spring 26 may be any type of spring known to one of skill in the art, including an elastomeric structure such as an o-ring. The spring may be formed from metal, plastic, or any suitable material. As shown, the spring 26 surrounds a portion of the projection 64 of the second portion 24 and abuts the surface 71 at the second end 74. The first end 57 of the spring 26 also fits in the opening 53 of the recess 52 and in the first portion 22. Together, the spring 26 and the distal section 36 of the first portion 22 slidably telescope into the space 70 between the projection 64 and the flange 60.

Installation and alignment of the magnet assembly 10 is as follows and is given with reference to placement of the magnet assembly 10 within a leveling tool 80. One of skill in the art, however, will readily recognize that the magnet assembly 10 may be placed in any device in which a magnet may be used. In the illustrated magnet assembly 10 in FIG. 1, the housing 20 is shown assembled with the spring 26 placed partially surrounding the projection 64 of the second portion 24 and abutting the surface 71 of the second portion 24. The first portion 22 is placed over the second portion 24 so that the spring 26 and the distal section 36 slidably mount interior to the flange 60. The first end 57 the spring 26 abuts the first portion 22 and the spring 26 is compressible between the first portion 22 and the second portion 24. The spring 26 biases the first portion 22 away from the second portion 24 in this state.

During installation, adhesive may be added. In the preferred embodiment, adhesive is added to the housing 20 after the housing 20 is placed in a tool. Alternatively, the adhesive may be added to the housing 20 prior to mounting the housing 20 in the tool.

Figure 5:
FIG. 5 is a bottom view of a level including the magnet assembly shown in FIG. 1.

In the preferred embodiment, the housing 20 assembled together with the spring 26 may be inserted into the opening 90 defined in the measuring surface 92 of a spirit level tool extrusion 94, as shown in FIG. 5. An adhesive, preferably a fluid adhesive, is supplied to the opening 90 and into the housing 20. By way of example, an adhesive such as urethane or epoxy may be used. A preferred urethane is Loctite #U-09FL that may be obtained from Henkel Loctite Corporation, Rocky Hill, CT. In the preferred embodiment, the magnet 28 is inserted into the opening 40 in the recess 44 of the first portion 22. One of skill in the art will recognize that the magnet 28 may be placed in the opening 40 prior to the addition of the adhesive. When the magnet 28 is mounted in the opening 40, at least a portion of the magnet 28 protrudes out of the pening 90 above the measuring surface 92 due to the biasing of the second portion 24 away from the first portion 22 by the spring 26. The top surface 46 of the magnet28 may be aligned to be coplanar with the measuring surface 92 of the level extrusion 94 by pressing the magnet 28 against the spring 26. The flange 54 of the first portion 22 preferably is used to position the magnet assembly 10 in the level extrusion 94 to hold the magnet assembly 10 in place below the measuring surface 92 and to hold the first portion 22 substantially perpendicular in the level extrusion 94 with respect to the measur In order to align the top surface 46 of the magnet 28 to be coplanar with the measuring surface 92, the magnet 28 may be pressed into position against the spring 26 in the opening 90. When the magnet 28 is aligned to be coplanar with the measuring surface 92, the top surface 46 is aligned with the measuring surface 92 by compressing the spring 26 allowing rapid and easy alignment of the magnet 28. The spring 26 allows for easy correction of the alignment of the magnet 26 to make the magnet coplanar with the measuring surface 92 by continually biasing the spring 26 away from the leveling tool 80. For example, if the top surface 46 of the magnet 28 is pressed below the measuring surface 92 during the aligning procedure, the spring 26 biases the magnet 28 away from the leveling tool 80 and above the measuring surface 92 for easy realignment. No additional tools or operator manipulation are necessary to realign the top surface 46 of the magnet 28 with the measuring surface 92 as would be required with the snap-in bracket, for example.

When the spring 26 is compressed, the first portion 22 and the second portion 24 telescope inward toward each other. The inward telescoping movement of the first portion 22 and the second portion 24 presses the adhesive into the housing 20, spreading the adhesive. The spring 26 may be compressed until the top surface 46 of the magnet 28 is aligned to be coplanar with the measuring surface 92. A metal plate, not shown, may be placed flush with the measuring surface 92 for alignment of the magnet 28. The metal plate draws the magnet 28 to the plate, for example if the magnet 28 is recessed within the tool 80 and the metal plate holds the magnet 28 level with the measuring surface. Once the magnet 28 is aligned, the magnet assembly 10 is held in place in the level 80 until the adhesive hardens and the magnet assembly 10 is secured in position with the top surface 46 of the magnet 28 fixedly aligned with the measuring surface 92. Preferably, the fixture time of the liquid adhesive is about 24 hours and the full cure time is about 72 hours. One of skill in the art will recognize that heat may be applied to shorten the fixture and curing times. Of course, other liquid adhesives may be used having differing times to fix and cure the adhesive used to secure the magnet assembly 10 into place in the leveling tool 80.

Alternatively, adhesive may be placed in the housing 20 prior to placing the housing 20 assembled with the spring 26 into the opening 90 of the measuring surface 92. The housing 20 may be assembled with the spring 26 and adhesive added to the housing 20 in the opening 40 of the first recess 44 of the first portion 22. The housing 20 and the spring 26 with the adhesive added may be positioned in the opening 90. The magnet 28 may be inserted into the opening 40 of the recess 44 and the top surface 46 may be aligned to be coplanar with the measuring surface 92 as described above. In the preferred embodiment of the present invention having a housing 20 that includes a first portion 22 and a second portion 24, contact surfaces are provided on the housing portions 22, 24 providing a greater surface area for the adhesive to adhere to in order to securely fix the magnet 28 into an aligned, coplanar position in the level 80. For example, a contact face 76 may be formed between an exterior surface 78 of the distal section 36 of the first portion 22 and an interior surface 79 of the flange 60 of the second portion 24. The recess 72 in the second portion 24 further provides a surface area for the adhesive to deposit and secure the second portion 24 in the level extrusion 94.

Alternatively, the magnet assembly 10 may be secured in position in the level extrusion 94 with a high strength spring 26 that biases the flange 54 of the first portion 22 against an interior surface 93 of the level 90 to hold the magnet 28 in calibrated position with respect to the measuring surface 92. In another alternative embodiment of the present invention, sonic welding may be used to secure the magnet 28 in an aligned position with respect to the measuring surface 92 against the bias of the spring 26.

Figure 6:
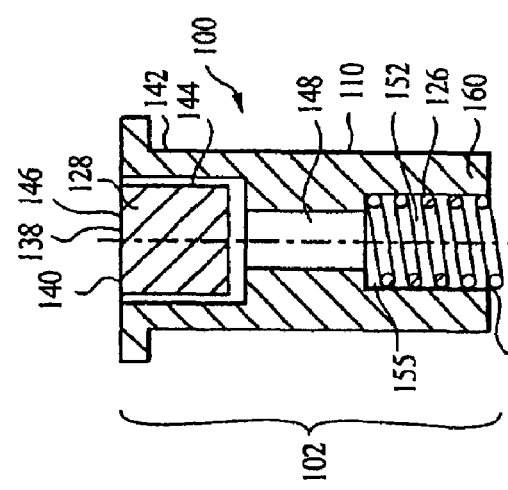
FIG. 6 is an alternative embodiment of a magnet assembly in accordance with the present invention.

In an alternative embodiment shown in FIG. 6, a magnet assembly 100 includes fewer components than the magnet assembly 10. The magnet assembly 100 includes a unitary housing 102, a spring 126 and a magnet 128. An outer surface 110 of the housing 102 may be generally cylindrically shaped, although any shape may be used, as described above for the first portion 22 of the housing 20. The housing 102 may further include a flange 154 extending radially outward as described for the first portion of the housing 22. The housing 102 includes an interior bore 138 defined inwardly from an opening 140 in a first end 142 to an opening 153 at a second end 160.

In a preferred embodiment of the housing 102, a first recess 144 is formed beginning at the opening 140 and the recess 144 is sized to receive the magnet 128 so that a top surface 146 of the magnet 128 may be calibrated to be level with a tool into which the magnet assembly 100 has been inserted. A second recess 152 is formed in the second end 160 of the housing 102. The recess 152 is sized to receive at least a portion of the spring 126. The spring 126 abuts the housing 102 and biases the housing 102 away from a tool into which the magnet assembly 100 is placed.

Installation and alignment of the magnet assembly 100 is as follows and is given with reference to placement of the magnet assembly 100 in a leveling tool 80 as shown in FIG. 5 and described for the magnet assembly 10. One of skill in the art will readily recognize that the magnet assembly 100 may be placed in any device in which a magnet may be used. The magnet assembly 100 shown in FIG. 6 may be placed into the opening 90 in the measuring surface 92 of the level extrusion 94. As described above for the magnet assembly 10, the magnet assembly 100 may be placed in the opening 90 and an adhesive may be added to the opening 90 and into the housing 102. The magnet 128 may be placed into the opening 140 in the first section 144. The top surface 146 of the magnet 128 may be aligned to be coplanar with the measuring surface 92 by biasing the magnet against the spring 126 until the top surface 146 is aligned with respect to the measuring surface 92 as described above and secured in position once the adhesive has solidified.

Alternatively, adhesive may be placed in the housing 102 prior to placing the housing 102 and the spring 126 into the opening 90 of the measuring surface 92. As described above for the magnet assembly 10, the housing 102 and the spring 126 of the magnet assembly 100 may then be placed in the opening 90, and the top surface 146 of the magnet 128 aligned and the magnet assembly 100 is held in place until the adhesive solidifies. The magnet assembly 100 may also be aligned and held in position with a high strength spring 126 or sonic welding as described above for the magnet assembly 10.

Figure 7:
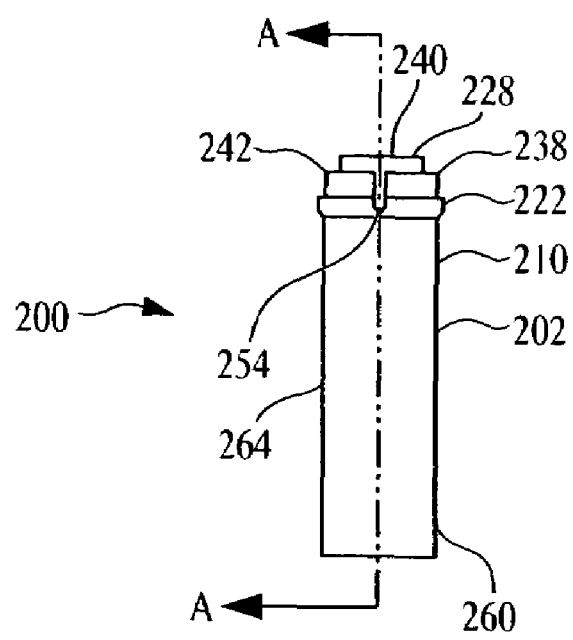
FIG. 7 is an alternative embodiment of a magnet assembly in accordance with the present invention.
Figure 8:
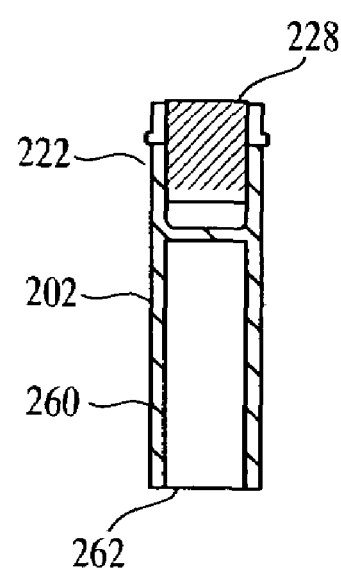
FIG. 8 is a sectional view of the embodiment shown in FIG. 7.

An alternative embodiment of a magnet assembly 200 is shown in FIGS. 7 and 8. The magnet assembly 200 includes a housing 202 and a magnet 228. An outer surface 210 of the housing may be generally cylindrically shaped, although any shape may be used as described above. The outer surface 210 may further include at least one flange 222 extending radially outwardly from the housing 202. The housing 202 includes a first end 242 defining an opening 238 therein for reception of the magnet 228. As shown in FIG. 7, the first end 242 may include a plurality of recesses 254 formed around the opening 238, extending toward the second end 260. Preferably, the first end 242 includes 4 recesses 254 offset by about 90° around the periphery of the opening 238, although any number of recesses 254 may be included. The recesses 254 allow the opening 238 to expand when the magnet 228 is inserted into the opening 238 as described below. The housing 202 may include an opening 262 defined in the second end 260 of the housing 202, as shown in FIG. 8. Preferably, the housing 202 is formed from a plastic material, such as ABS plastic. However, any material known to one of skill in the art may be used to form the housing 202.

Installation and alignment of the magnet assembly 200 is as follows and is given with reference to placement of the magnet assembly 200 in a leveling tool 80 as shown in FIG. 5. One of skill in the art will readily recognize that the magnet assembly 200 may be placed in any device in which a magnet may be used. The housing 202 may be inserted into the opening 90 defined in the measuring surface of the leveling tool 80. Preferably, the inner diameter 91 of the opening 90 is smaller than the outer diameter 264 of the housing 202 to provide a friction fit of the housing 202 in the opening 90. The flanges 222 may provide additional surfaces for engagement of the housing 202 with the opening 90. The magnet 228 may be pressed into the opening 238 in the first end 242 of the housing 202. Preferably the magnet 228 is pressed into the opening 238 of the housing 202 using about 400 pounds per square inch of force to drive the magnet 228 into the smaller opening 238 of the housing 202 and thereby secure the magnet 228 by frictional engagement. More preferably, installation of the magnet 228 by force aligns a surface 240 of the magnet 228 with the measuring surface 92, within a maximum of about 0.005 to 0.010 inches below the measuring surface 92 of the tool 80, most preferably, maximally about 0.007 inches below the measuring surface 92. The recesses 254 allow the first end 242 to deflect outwardly as the magnet 228 is forcibly pressed into the opening 238.

Alternatively, the magnet 228 may be held in the housing 202 by the addition of an adhesive. The adhesive may be added to the opening 238 before or after the housing 202 is inserted into the opening 90 of the tool 80 as described above. Adhesive may also be used to secure the housing 202 in the opening 90 of the level 80.

Although the invention herein has been described in connection with a preferred embodiment thereof, it will be appreciated by those skilled in the art that additions, modifications, substitutions, and deletions not specifically described may be made without departing from the spirit and scope of the invention as defined in the appended claims. It is therefore intended that the foregoing detailed description be regarded as illustrative rather than limiting, and that it be understood that it is the following claims, including all equivalents, that are intended to define the spirit and scope of this invention.

The invention claimed is:

1. A method of mounting a magnet assembly in a leveling tool having a measuring surface comprising:
    providing a magnet assembly comprising a housing having a first portion and a second portion and a spring biasing said first portion away from the second portion and a magnet on the first portion;
    placing said magnet assembly into an opening defined in measuring surface, said opening sized to receive said magnet assembly and said magnet being biased by said spring relative to said measuring face;
    pressing said magnet against said spring to move said magnet toward the second portion where said magnet is in a desired alignment relative to said measuring surface; and
    permanently securing said magnet when it is in said desired alignment.

2. A leveling tool comprising:
    a measuring surface;
    an opening defined in said measuring surface;
    a magnet assembly located at least partially within said opening, said magnet assembly comprising:
        a housing having at least a first portion and a second portion;
        a magnet secured to said first portion; and
        a spring compressed between the first portion and the second portion; and
        means for permanently fixing said first portion relative to said second portion such that said spring cannot move said first portion relative to said second portion.

3. The leveling tool of claim 2 wherein said spring is a helical ring.

4. The leveling tool of claim 2 wherein said at least a first portion and said second portion are telescopically mounted relative to one another.

5. The leveling tool of claim 2 wherein a surface of the magnet is aligned with said measuring surface.

6. The leveling tool of claim 2 wherein said housing is made of plastic.

7. The leveling tool of claim 2 wherein said first portion includes a recess for receiving said magnet.

8. The leveling tool of claim 2 wherein said means for permanently fixing comprises adhesive.

9. The leveling tool of claim 2 wherein said means for permanently fixing comprises sonic welding.

10. The leveling tool of claim 2 wherein said means for permanently fixing comprises a high strength spring.

* * * * *